Sept. 20, 1955 G. E. HERRNSTADT 2,718,132

KNITTED PILE FABRIC

Filed Aug. 17, 1954 4 Sheets-Sheet 1

INVENTOR

*Gerald E. Herrnstadt*

BY *Leech and Radue*

ATTORNEYS

INVENTOR

Gerald E. Herrnstadt

BY Leech and Radue

ATTORNEYS

KNITTED PILE FABRIC

Filed Aug. 17, 1954

INVENTOR

Gerald E. Herrnstadt

BY Leech & Radue

ATTORNEYS

Sept. 20, 1955 G. E. HERRNSTADT 2,718,132

KNITTED PILE FABRIC

Filed Aug. 17, 1954 4 Sheets-Sheet 4

INVENTOR

Gerald E. Herrnstadt

BY Leech & Radue

ATTORNEYS 2,718,132
Patented Sept. 20, 1955

2,718,132

KNITTED PILE FABRIC

Gerald E. Herrnstadt, Cornwall, N. Y., assignor to The Firth Carpet Company, Inc., New York, N. Y., a corporation of New York Application August 17, 1954, Serial No. 450,381

10 Claims. (Cl. 66—191)

This invention relates to a knitted pile fabric comprising a novel, indirect, design-forming construction. While the principles thereof are applicable to many types of knitted fabrics, they are especially adapted to the manufacture of rug and carpet materials.

Although the adaptation of knitting machinery to the manufacture of broadloom carpets and rugs is not a recent development in the art, the production of fabrics of this kind that are comparable to woven types of carpeting and rugs is relatively new. Those disclosed in J. R. Little, Jr., et al. U. S. Patent No. 2,476,153 and W. A. Rice U. S. Patent No. 2,531,718 represent fabrics of this kind. The weaves of both are restricted, however, to stripes in the first instance and squares in the second. In the construction of the Little patent streaks in the pile surface are likely to occur when all the pile elements in a lengthwise row are formed entirely of a single yarn, and those of an adjacent row are formed entirely of another single yarn. In solving this troublesome problem the Rice patent teaches the burying or embedding of a substantial portion of the pile yarn in the body of the fabric. The present invention, in addition to providing for additional patterns and design effects not attainable by the prior practices of the art, avoids the streaking and yarn embedding limitations of the Little and Rice patents, respectively.

It is a primary object of this invention to produce on a form of knitting machine a fabric in which weft filling yarn for the back and face yarn for the pile surface are tightly bound together by knitting stitch warps in such a manner that neither the face yarn nor the back yarn is susceptible to easy ripping, pulling, or the dropping of a stitch.

Another important object of this invention resides in the provision of a knitted pile broadloom fabric in which the back yarn is working continuously in a sidewise back and forth movement giving the appearance of a woven back when finished, and in which the face or pile yarn is worked so as to create a twill, corduroy, or diamond type ornamental construction within the knit face pile.

A further object of this invention is to provide a knitted pile fabric having a construction distinguished by the fact that the pile loop formed by a pile yarn end in the space between two stitches of adjacent warp rows is not adjacent, or parallel (either horizontally weftwise or vertically warpwise) to the loop formed by the same yarn end in the following weft course, except in the case of reversal from one direction to the other.

It is also an object of this invention to provide a face pile carpet with simple ornamental patterns that can be made on a knitting machine.

A still further object of this invention is to provide a knit-type pile floor covering in which alternate weftwise loops may be of different pile heights, and in which, when the pile yarn is threaded in different color shadings and moves sidewise a number of times and returns in the opposite direction, the loops of various color shadings will appear high and low alternately.

The foregoing and other objects of the invention will be more fully understood from the following detailed description of a preferred embodiment, and modifications thereof, when taken in connection with the accompanying drawings, in which.

Figure 1:
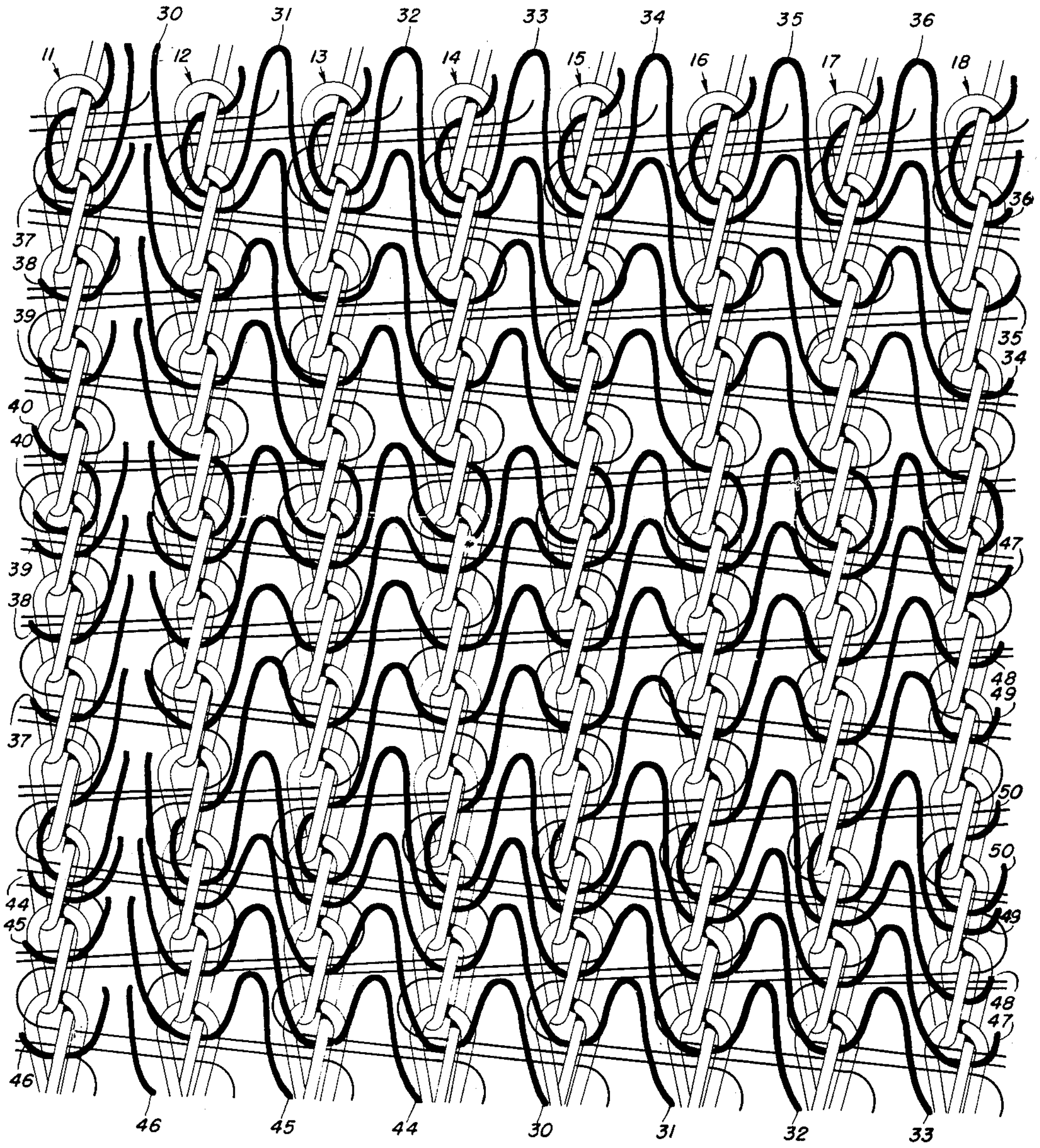
Fig. 1 is a semi-diagrammatic plan view illustrating the interengagement of the yarns forming the preferred embodiment of the novel fabric.

The novel construction and advantages of the knitted pile fabric will be explained with particular reference to the complete arrangement as illustrated in Fig. 1. In this figure the warp lines of knitting stitches 11, 12, 13, 14, 15, 16, 17 and 18 are arranged vertically. The formation of the loop stitches of the parallel, warpwise arrangement is clearly shown in this figure, and also in Figs. 2 and 3, as conventional knit chain stitches, which are preferably of strong cotton.

Figure 2:
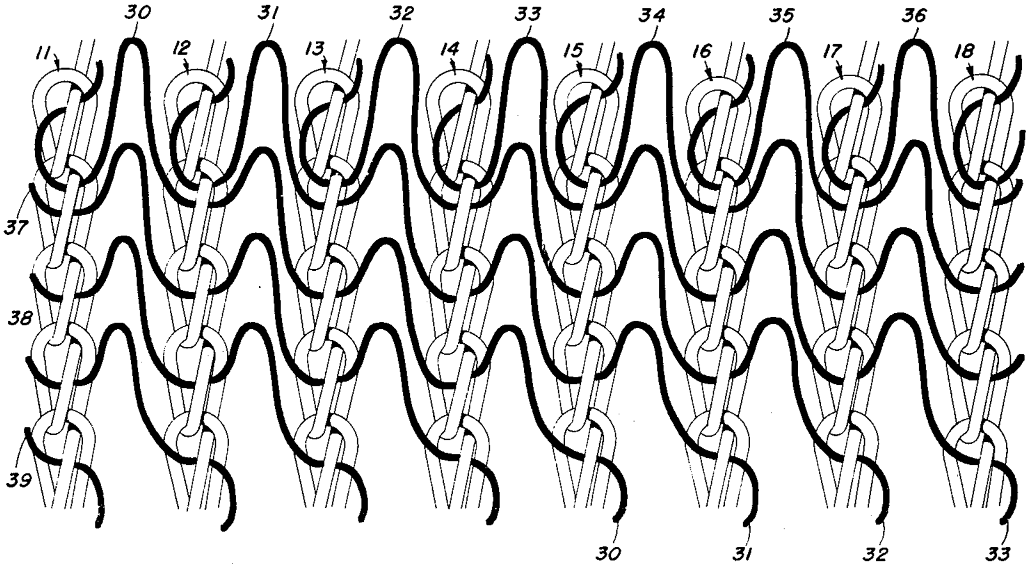
Fig. 2 is a similar view of a more limited portion of the construction of Fig. 1, in which the backing material has been omitted.
Figure 3:
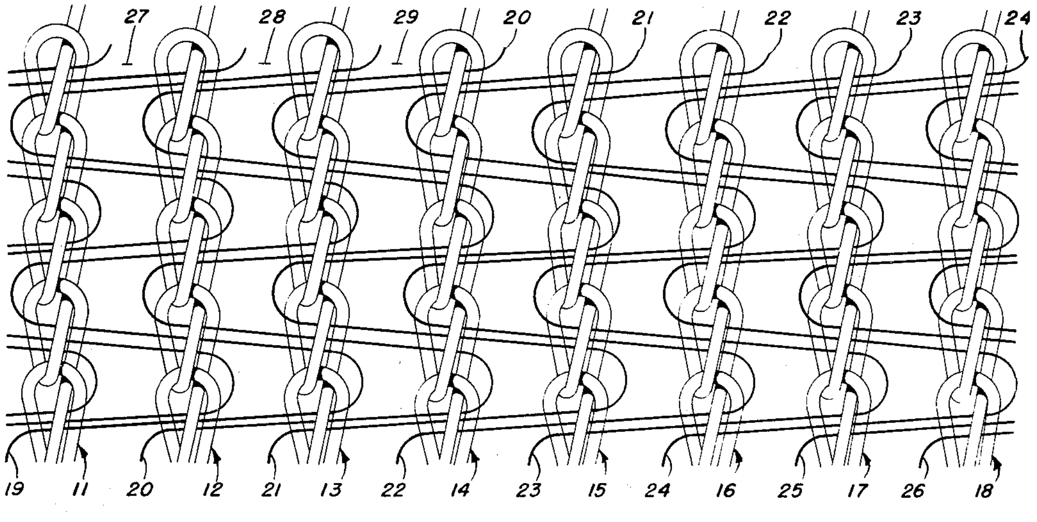
Fig. 3 is a view like that of Fig. 2 in which the pile face yarn has been left out of Fig. 1.

In Fig. 3 a series of backing threads 19, 20, 21, 22, 23, 24, 25 and 26 of weft formation are indicated by fine solid lines representative of back filling yarns. Fig. 2 shows a series of face yarn wefts 30, 31, 32, 33, 34, 35, 36, 37, 38 and 39 which are bound into the bights of the warp lines of stitches 11 to 18.

As shown in Fig. 1, the face yarn 37 in forming loops travels transversely through bights of the chain stitch formations from warp line 11 to warp line 12, across to the following weftwise stitch of warp line 13, and after continuing in such fashion as the required face appearance of the desired fabric makes necessary, the yarn 37 is reversed in its direction in the weft stitches thereafter. The ornamental effects which can thus be created will be more particularly explained in connection with Fig. 4.

The back construction of the fabric is shown in its preferred form most clearly in Fig. 3. The yarn used for the weftwise backing threads 21 to 26 is preferably jute, linen or other material corresponding to those customarily used by the carpet industry for keeping the fabric in good shape and providing good acceptability of back sizing materials such as starch, rubber or the like. It is to be understood, however, that this back construction of itself is not a matter of invention, since it displays only the basic principle of the art of knitting as used ever since knitted fabrics were first produced. The preferred fabric base is a flat knitted fabric that interlocks weft yarn which is connected together by a plurality of warp chains. In this fabric each of the weft yarns is moved laterally across and through three chain stitches in one direction in the same weft course, reversing itself in direction and again moving over three chain stitches to repeat the movement of the previous course in a following one. The weft yarn 19 moves crosswise through warp lines of chain stitches 11, 12 and 13 in the first course, and in the second course this same yarn 19 returns over warp stitches 13, 12 and 11 to its basic placement in the fabric. Backing yarn 20 moves across and through the bights of the warp lines of chain stitches 12, 13 and 14 in the first weft shot and then reverses itself in the second one by going through the bights of the warp lines of chain stitches 14, 13 and 12 to its basic placement. Due to the application of the basic knitting method, the back construction of Fig. 3 appears to have two weft yarns in each transverse line of the weft in between two adjacent stitches as shown in spaces 27, 28 and 29 of Fig. 3. Unless the movement is over three stitches, only a single weft yarn would appear on the back per course and the resulting fabric would be quite flimsy. In a fabric having only a very small amount of stitches per inch, either a backing yarn of a thicker diameter is employed, or use is made of a movement of basic knitting in which the weft yarn goes over four or five stitches at the same time.

In Fig. 2, which shows the face formation to an enlarged scale, the backing yarn has been left out completely in order to explain the illustrative embodiment of the invention more clearly. The parallel chain stitch warps 11 to 18 are arranged with the chain stitches aligned horizontally or weftwise. A face yarn 30 in the first course moves to the left side from chain stitch warp 15 to chain stitch warp 14. While so doing, and before forming of the next lower weft shot and chain stitch, the pile is produced. In the next course and after formation of a chain stitch warp 14, the face yarn 30 moves to the left again from warp 14 to warp 13, and in the third course this procedure is repeated and the pile yarn moves from warp 13 to warp 12. Thereafter, face yarns cross from warp 12 to warp 11, and in the following pick the face yarn movement is reversing itself in traveling from warp 11 to warp 12; and in each following weft formation, it goes rightwise from warp 12 to warp 13, warp 13 to warp 14, and warp 14 to warp 15, until it again reaches a point of reversal and turns leftwise. As face yarns move individually rightwise or leftwise, respectively, and before the chain stitch adjacent to the one which already has a face yarn tied in the previous weft shot completes itself, the pile yarn is pulled to such a pile height as is required for the particular fabric, and the loop is thereby formed. While the face yarn is still held loopwise in the length required for the face of the fabric, the adjacent chain stitch is formed and a loop is thereby made.

In the present example, the face yarns 30, 32, 34 and 36 are of a different color than the face yarns 31, 33, 35 etc., and the loops being formed between the chain stitch warps 11 and 12, 13 and 14, 15 and 16, and 17 and 18 are higher than those formed between the chain stitch warps 12 and 13, 14 and 15, 16 and 17, etc., and the loops of the fabric will be of varying heights in varying colors.

From the above description it will be understood that the present invention is not limited in its application to a knit pile fabric floor covering having a pile surface of uniform height, since the pile can be varied as may be desired.

Figure 4:
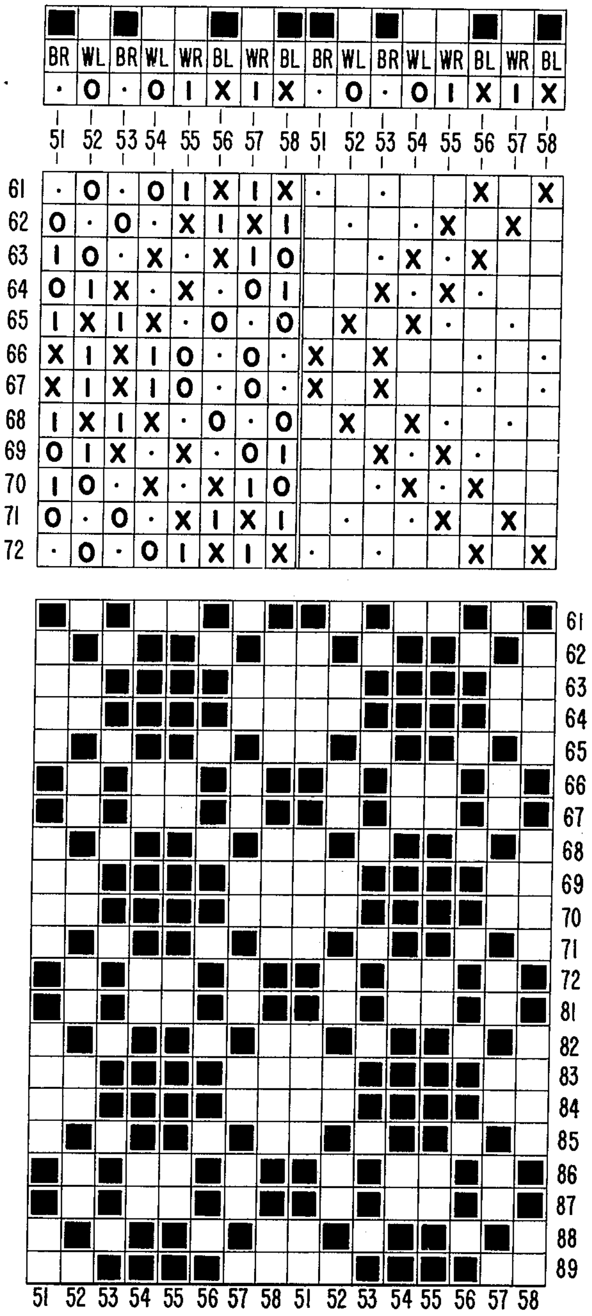
Fig. 4 is a pattern layout drawing showing diagrammatically the distribution and movement of pile yarn in one embodiment of the fabric of this invention.

The pattern layout drawing of Fig. 4 illustrates one ornamental form of fabric that may be thus produced. The pattern of this figure uses pile face yarn of opposite colors or shades. The three vertically spaced and aligned subdivisions of Fig. 4 are related to each other as will be explained. In the two lower subdivisions each square identifies a loop or cut pile tuft of the finished fabric. Each corner point of each of these squares identifies an actual chain stitch. The ornamental fabric effect is most clearly illustrated in the bottom part which comprises a plan view of a section of fabric drawn to a slightly enlarged scale.

In describing the construction of Fig. 4 the two opposing colors will be referred to as black and white, with "BR" and "BL" signifying black right and black left, and "WR" and "WL" correspondingly representing white right and white left. In the upper section of Fig. 4 the chart containing these designations employs a dot to represent a black right face yarn 51, a circle to represent an adjacent white left face yarn 52, a vertical line to represent white right face yarn 55, and an X or cross to designate black left face yarn 56. In each instance right or left movement of the black or white face yarn is distinguishable by the corresponding symbol representation appearing thereunder in the tabulation comprising the upper section of Fig. 4.

The pattern example shows a repeat of the drawing of face yarn for the ornamental appearance presented. For this construction an end of face yarn such as 51 has to be in the first course 61 of a series shown at the left margin of the middle section of the Fig. 4 drawing, and jumps in the following course 62 into the zone originally outlined by face yarn 52 in course 61, now having moved in the face yarn alignment 51 into course 62. This is accomplished by having the black ends 51 and 53 (BR) and the white ends 55 and 57 (WR) move rightwise in each following course, and the black ends 56 and 58 (BL) as well as the white ends 52 and 54 (WL) move leftwise in each following course until they come to the point of reversal in course 67, the ends that have previously gone right then turning left and vice versa to create a repeat pattern which is twelve warpwise and eight weftwise, namely, a twelve by eight repeat. In order to simplify this ornamental arrangement the repeat may be continued sidewise but not lengthwise, the right half of the middle section of Fig. 4 identifying only the black ends, and leaving the actual loop spaces of the white ends empty. It will thus be seen that the adjacent face yarns never occupy the same space in the fabric while going from one loop formation to the other, nor do they actually overlap each other in those spaces where the pile of the yarn is formed. But during the movement to the right or left, respectively, they do cross each other through the bight of the chain stitch, with never more than two of them so crossing through the chain warp.

The fabric constructed as described above achieves the purposes of assuring that evenness of the warp tension and the take-up of the face yarn be equal in all cases, and avoiding unintended high and low spots, or thick and thin appearances in the fabric, resulting from other than intentional high or low loops or tufts. These factors are important in a floor covering fabric since it is preferred to use fairly coarse thread or yarns for a carpet or rug material that has to withstand much wear.

While the fabric ornamentally outlined in Fig. 4, or shown in solid color in Fig. 1, might be satisfactory for use in the condition in which it leaves the loom, it is preferable to finish the fabric by back sizing with a rubber type liquid material applied by a roller or knife coating process, and followed by passage through a dryer. Although the novel fabric construction herein disclosed will not ravel or rip apart as easily as other previously known knit type fabrics, and although such fabric is primarily meant for floor covering purposes, it must be flat, without buckles, and should preferably be so constructed as to make it possible for the carpet layer to cut out small individual pieces without causing fraying which would necessitate binding. It is for these reasons that back sizing of the fabric is highly desirable. Where a rubber type material is used for the back sizing, it will also impart skid resistance and assure longer wear.

The pile fabric floor coverings made in accordance with the principles of Figs. 1, 2, 3 and 4 are characterized by a heavy dense pile surface in which the loops or tufts stand side by side in spaced touching relation. A complete masking of the backing and the chain stitch binding warps can thus be achieved with bulky yarns held tight in position.

Figure 5:
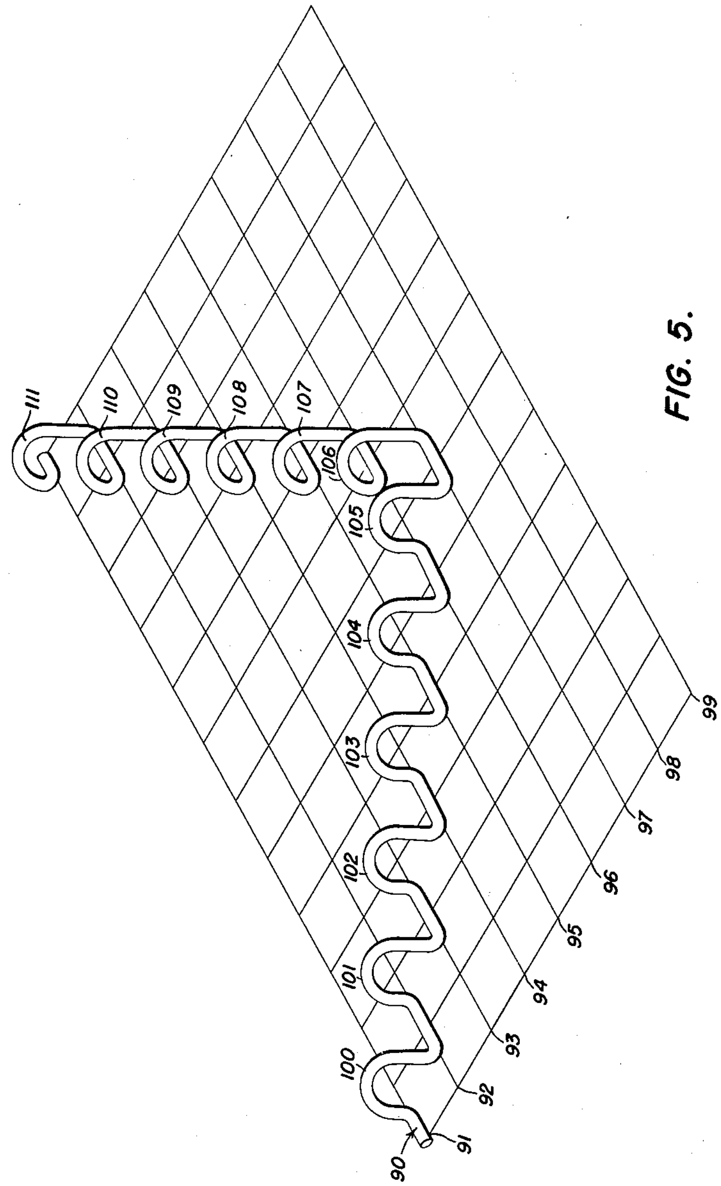
Fig. 5 is an isometric and partially diagrammatic side view of a modified fabric, with all but one end of the face yarn omitted.

Fig. 5 of the drawings represents a modified form of the invention disclosed and differs from that previously described in that it uses less pile yarn, and, in the exemplification selected, merely creates a herringbone-type face effect.

In order to give the same strength and durability to this type of fabric as in the other, and at the same time enable the manufacturer to minimize the high cost of face yarn, a face yarn is made to appear only here and there. For simplification the backing material is not shown in Fig. 5 and only one face yarn is illustrated. The base construction of spaced chain stitch warps and back and forth extending weft material appears only diagrammatically.

In this embodiment it is preferred to use a warp of the same coloring as the backing weft material, such filling yarn being flatly inserted as indicated in Fig. 3, but being of a type like roving and of a large diameter. This will produce a backing base that not only has additional stability and strength, but will in itself be a fabric imitating a flat woven floor covering. Chenille fur and material of that type in various thicknesses and combined colorings can also be used for this purpose in order to give this backing yarn, when uncovered by a pile surface, a plush-type effect. When so applied and tightly knitted, the back sizing will not leak through the backing construction or impair the very fine appearance presented.

In threading the face yarn it is inserted only in an occasional space, thereby more or less superimposing the design forming pile on the flat base and giving a carved effect. As will be understood from an examination of Fig. 5, a pile yarn 90 is first tied in by a warp stitch 91 and then is moved rightwise through the corresponding bight of a warp stitch 92 to form a loop 100 and initiate the formation of a loop 101 in the succeeding course. In this example, a loop 102 is tied in by a warp stitch 94, loop 103 by a warp stitch 95, a loop 104 by a warp stitch 96, a loop 105 by a warp stitch 97, a loop 106 by the warp stitch 96, the pile yarn thread 90 having thus reversed itself and moving in the opposite sidewise direction in the weft course, thereafter forming a loop 107 between the warp chain stitches 96 and 95, and moving in the same manner to form the additional loops 108, 109, 110 and 111 as shown.

Although during the forming of the pile yarn of the several knitted pile fabrics disclosed herein the yarn first takes the form of a loop, a final cut pile fabric is readily attainable. Where desired, the cut pile can be achieved by manual operation or by a stationary knife or shearing process. Where a cut and uncut pile is desired, as in Fig. 1, the stationary knife process has to be employed, but in the case where an all cut pile surface is desired, the shearing process will be found satisfactory.

While a preferred embodiment and several modifications of the knitted pile fabric of this invention have been described in detail, it will be apparent to those skilled in this art that variations and changes can be made without departing from the inventive principles and the scope of the appended claims.

Having thus disclosed my invention and the preferred manner of practicing the same, what I claim as novel and desire to secure by Letters Patent of the United States is:

1. A pile fabric floor covering comprising a flatly knitted base formed by wefts extending individually back and forth laterally over a plurality of chain stitch warps in successive courses and having superimposed thereon pile face yarns, forming raised tufts between adjacent chain stitch warps, said raised tufts appearing between different adjacent pairs of chain stitch warps in successive weft courses for a number of times, with each pile face yarn extending in a given number of courses across a larger number of said chain stitch warps than the individual wefts of the flatly knitted base and being bound by no more than two chain stitches within the same course.

2. A knitted pile fabric floor covering having spaced parallel chain stitch warps with the stitches thereof aligned transversely in courses, base wefts extending individually back and forth laterally across at least three chain stitch warps in each course, and raised face pile yarns extending coursewise and diagonally across a greater number of chain stitch warps than the individual base wefts and each being bound by no more than two chain stitches within the same course.

3. A knitted pile fabric floor covering having spaced parallel chain stitch warps with the stitches thereof aligned transversely in courses, base wefts extending individually back and forth laterally across at least three chain stitch warps in successive courses, and raised face pile yarns of loop form extending coursewise and diagonally back and forth across a greater number of chain stitch warps than the individual base wefts and being bound by no more than two chain stitches within the same course.

4. The fabric floor covering of claim 3 in which the pile loops are of varying heights.

5. The fabric floor covering of claim 3 in which at least some of the loops have been severed to provide a cut pile formation.

6. A knitted pile fabric floor covering having spaced parallel chain stitch warps with the stitches thereof aligned transversely in courses, base wefts extending individually back and forth across three chain stitch warps in successive courses, and raised face pile yarns individually extending coursewise and diagonally across five chain stitch warps and each being bound by only two chain stitches within the same course.

7. A knitted pile fabric floor covering having spaced parallel chain stitch warps with the stitches of said warps aligned transversely in courses, back wefts extending individually back and forth laterally in successive courses across at least three chain stitch warps, and raised face yarns extending individually back and forth laterally in successive courses across a greater number of chain stitch warps than do the individual back wefts, said face yarns forming raised tufts between each adjacent pair of stitches of adjacent chain stitch warps and advancing coursewise and diagonally from one chain stitch to the next chain stitch of each of the chain stitch warps as they extend back and forth, said back wefts and face yarns passing through the bights of the respective chain stitches to which they extend and being bound therein.

8. A knitted pile fabric having chain stitch warps, base wefts extending individually back and forth across at least three warps, and pile face yarns interengaged with the warps and extending rightwise for a plurality of courses, reversing, and extending leftwise for a plurality of courses, whereby vertical yarn streaks in the pile fabric are avoided.

9. A knitted pile fabric having chain stitch warps, base wefts extending individually back and forth across at least three warps, and pile face yarns interengaged with the warps and extending rightwise for a plurality of courses, reversing, and extending leftwise for a plurality of courses, the pile face yarns being raised out of the fabric between adjacent pairs of chain stitch warps, whereby vertical yarn streaks in the pile fabric are avoided and a pattern is produced.

10. A knitted pile fabric floor covering having a flat backing base of spaced chain stitch warps, wefts of heavy yarn extending individually back and forth across at least three chain stitch warps in successive courses, and at least one raised pile yarn extending coursewise and diagonally across a plurality of successive chain stitch warps, extending reversely, and extending coursewise and diagonally across a plurality of successive chain stitch warps in another direction, the pile yarn thus raised passing through the respective chain stitches and being bound therein.

References Cited in the file of this patent

UNITED STATES PATENTS

| | | |
|---|---|---|
| 2,229,469 | Newman | Jan. 21, 1941 |
| 2,396,525 | Newman | Mar. 12, 1946 |
| 2,400,524 | Amidon | May 21, 1946 |
| 2,476,153 | Little et al. | July 12, 1949 |
| 2,531,718 | Rice | Nov. 28, 1950 |
| 2,696,723 | Frith | Dec. 14, 1954 |